United States Patent [19]
Alloul et al.

[11] Patent Number: 6,032,130
[45] Date of Patent: Feb. 29, 2000

[54] MULTIMEDIA PRODUCT CATALOG AND ELECTRONIC PURCHASING SYSTEM

[75] Inventors: Albert Alloul, Montreal; Allan Brown, St. Hubert; James Anglehart, Montreal, all of Canada

[73] Assignee: Video Road Digital Inc., Montreal, Canada

[21] Appl. No.: 08/956,154

[22] Filed: Oct. 22, 1997

[51] Int. Cl.[7] ............................................. G06F 17/60
[52] U.S. Cl. ................................................. 705/27
[58] Field of Search ........................................ 705/26, 27

[56] References Cited

U.S. PATENT DOCUMENTS

| | | |
|---|---|---|
| 4,905,094 | 2/1990 | Pocock et al. . |
| 4,949,257 | 8/1990 | Orbach . |
| 5,053,956 | 10/1991 | Donald et al. . |
| 5,267,171 | 11/1993 | Suzuki et al. . |
| 5,319,542 | 6/1994 | King, Jr. et al. . |
| 5,339,239 | 8/1994 | Manabe et al. . |
| 5,351,186 | 9/1994 | Bullock et al. . |
| 5,451,998 | 9/1995 | Hamrick . |
| 5,465,291 | 11/1995 | Barrus et al. . |
| 5,478,989 | 12/1995 | Shepley . |
| 5,499,707 | 3/1996 | Steury ..................................... 194/217 |
| 5,528,490 | 6/1996 | Hill . |
| 5,546,316 | 8/1996 | Buckley et al. . |
| 5,551,021 | 8/1996 | Harada et al. . |
| 5,561,604 | 10/1996 | Buckley et al. . |
| 5,576,951 | 11/1996 | Lockwood ............................... 395/227 |
| 5,694,546 | 12/1997 | Reisman ................................ 395/200.9 |
| 5,870,717 | 2/1999 | Wiecha ...................................... 705/26 |

Primary Examiner—Allen R. MacDonald
Assistant Examiner—Susanna Meinecke-Diaz
Attorney, Agent, or Firm—Swabey Ogilvy Renault

[57] ABSTRACT

An electronic system that provides multimedia product presentations in real-time, by combining locally-stored data and data received from a remote server. Large volumes of data, representing product information such as motion images and sound, are stored locally on the system's data storing unit for fast data access. Small volumes of product time-variable data are received over a network from a remote server, which also has a transaction management function. The purchasing system combines the local and received data in order to provide both real-time and up-to-date product information to customers. Two versions of the purchasing system are provided. The first one is a multimedia public purchasing kiosk for use in malls and shopping centers. The second one is a PC-based purchasing system, equipped with multimedia capabilities. It uses a purchasing application which is distributed beside the large volumes of product-related data on a portable support such as a CD-ROM and which is intended for personal use, at home, on the customer's PC.

28 Claims, 4 Drawing Sheets

MULTIMEDIA PRODUCT CATALOG AND ELECTRONIC PURCHASING SYSTEM

FIELD OF THE INVENTION

The present invention relates to a method and system for presenting real-time multimedia product information, such as catalog information, to customers. The present invention also relates to a system for placing electronic orders of items from such a catalog.

BACKGROUND OF THE INVENTION

Traditionally, product catalogs containing graphical and written information about products and services offered for sale have been printed and then distributed to potential clients. The customers would browse the catalog and select items to be purchased. They would then complete a paper order form or telephone to the supplier to order the items. The whole process, from printing of the catalog to receipt of the order, would usually take a long time and is relatively expensive to manage.

A further drawback of printed catalogs is that current product availability information is not available at the time that the consumer browses the printed catalog. Furthermore, prices must be fixed for the duration of the catalog's circulation which may be a disadvantage for the vendor when stock product prices go up during a specific period. None of the information included in the printed catalog delivered to clients may be changed after printing and delivery.

An improvement over this system is to offer on-line product information via the Internet. A client can access a vendor's or supplier's web site, browse a product catalog, download product information such as still and motion images, and possibly order selected items via the Internet. This system may also provide pricing and stock availability information that the supplier may change by programming the web page. However, this method has the drawback that browsing is slow due to the large volume of data required for graphical images being downloaded through the Internet. Product videos or animated pictures, also comprising sound and music, require even larger amounts of data and cannot be viewed in real time with conventional technology. Users' loss of interest, due to the long image download period, results in loss of sales.

SUMMARY OF THE INVENTION

It is an object of the present invention to provide in real-time up-to-date and easy-to-use multimedia product catalogs for customers.

It is also an object of the present invention to allow on-line up-to-date product price and availability information for customers as well as on-line instant product ordering in association with electronic payment using credit cards or other electronic funds.

The present invention discloses an electronic purchasing system offering multimedia product catalogs by combining transmitted and locally-stored data which allow real-time multimedia product presentations and instant on-line product ordering. The invented purchasing system stores large product multimedia catalogs on local mass storage means and allows at the same time small volumes of time-variable data to be obtained by telecommunication means. This allows complete real-time product information to be presented to the customer, using motion and still images, sound and text. The principle is to have a high bandwidth part of the presented data coming from the fixed storage means that allow quick data access for large graphical files, and a low bandwidth communication means for time-variable data coming from a remote server via a network.

The small volumes of transmitted time-variable data are used for keeping the purchasing system on-line in order to communicate order forms, credit card or other electronic funds validation information, price or product availability information with a transaction server and with the suppliers' servers. As only small volumes of data are transmitted over the network, the whole purchasing system provides real-time multimedia purchasing information.

The purchasing system may further comprise multimedia presentation means and may be installed in malls and shopping centers for public access. The system may run an application program which is easy-to-use and that may include limited functional choices which may be located at the same position on each screen for easy access.

Another object of this invention is to provide CD-ROM multimedia catalogs for use on customers' multimedia personal computer(PC), at home or at their office. In that case, the PC has to be equipped with communication means such as a modem in order to receive the small volumes of data as described above. In this case, revenue may be generated by selling the CD-ROM and by transaction fees.

In another embodiment of the present invention, the electronic purchasing kiosk may further comprise a CD-ROM dispenser for selling automatically to customers multimedia catalogs stored on CD-ROMs as described more in detail further in this text.

In another preferred embodiment of the present invention, the purchasing kiosk may be equipped with an electronic payment card reader, such as a credit or debit card reader, for instantly charging customers for their purchase or for the purchased multimedia product CD-ROM.

Revenue may be generated by renting the electronic public kiosk to suppliers. A fee may also be charged to the customer for every transaction and the supplier may be charged for entering items into the catalog database.

In both versions of the invention, the purchasing kiosk or the client's PC may be connected via a network to a transaction server which is further connected to suppliers' servers. The transaction server may be used to collect orders from the terminals, to forward the orders to the suppliers and to bill the customers and/or the suppliers for the transactions.

According to a first broad aspect of the invention, there is provided a multimedia catalog system comprising: mass storage means for storing locally at least one electronic multimedia catalog containing a large volume of product-related data representing each of a plurality of products to be sold, the mass storage means having a data retrieval speed sufficient for real-time presentation of the multimedia product-related data; communication means for obtaining from a remote server small quantities of time-variable data related to a selected product, representing at least one of product price and product availability; and multimedia means for presenting the large volumes of data and the time-variable data in association with one another, in real-time for a selected one of the plurality of products.

The invention also provides a multimedia public purchasing kiosk comprising: mass storage means for storing locally at least one electronic multimedia catalog containing a large volume of product-related data representing each of a plurality of products to be sold, the storage means having a data retrieval speed sufficient for real-time presentation of the product-related data; communication means for obtaining from a remote server small quantities of time-variable data related to a selected product, representing at least one of product price and product availability; and multimedia means for presenting the large volumes of data and the time-variable data in association with one another, in real-time for a selected one of the plurality of products.

According to a further broad aspect of the invention, there is provided a method of presenting multimedia product information comprising the following steps: providing a multimedia product presentation system including mass storage means for storing large volumes of product-related data locally for fast data access; obtaining from a remote server small quantities of time-variable data representing at least one of product price and product availability; presenting in real-time the large volume of data and the time-variable data in association with one another, for a selected one of the plurality of products.

The invention further provides a multimedia catalog purchasing system comprising: mass storage means for storing locally at least one electronic multimedia catalog containing a large volume of product-related data representing each of a plurality of products to be sold, the mass storage means having a data retrieval speed sufficient for real-time presentation of the multimedia product-related data; communication means for obtaining from a first remote server small quantities of time-variable data related to a selected product, representing at least one of product price and product availability, and for carrying out communication of purchase transaction data with a second remote server; multimedia means for presenting the large volumes of data and the time-variable data in association with one another, in real-time for a selected one of the plurality of products; product selection and ordering means for obtaining a user input for product order selection and for placing an electronic order; and order processing means located at the second server for receiving the electronic order, authorizing payment for the product order selection, and placing at least one order on behalf of the user. The first and second servers may be provided by a same server.

In another aspect of the present invention, the time-variable data sent from the transaction server to the client's terminal may contain catalog structure control data intended to be used by the multimedia presentation means for organizing the large volumes of product related data stored locally for presentation in a particular layout. In this way, the catalog system can be structured differently over time using the same large volume of stored data and offer a catalog tailored to the current market or the customer.

BRIEF DESCRIPTION OF THE DRAWINGS

The invention will be better understood by way of the following detailed description of a preferred embodiment with reference to the appended drawings, in which.

DETAILED DESCRIPTION OF THE PREFERRED EMBODIMENT

The electronic purchasing system related to the present invention provides real-time multimedia product presentation for customers using a combination of locally-stored data and transmitted data. Large volumes of data, comprising multimedia product catalogs with still and motion images, sound and text, are stored on local mass storage means for fast data access. Small volumes of data, comprising time-variable product information such as price and/or availability data, are received over a network from a transaction server. The connection is bi-directional allowing electronic payment for purchased products, price corrections, stock availability checking and product ordering to be done almost instantly.

The specific combination of data, made up of large volumes of locally-stored data associated with small volumes of remotely obtained time-variable data is a key feature of the present invention. It allows for both real-time multimedia presentations, by reducing the data access delay to the large volumes of data stored locally, and instant on-line ordering as well as obtaining time-variable information by exchanging small volumes of data with a remote server.

Figure 1:
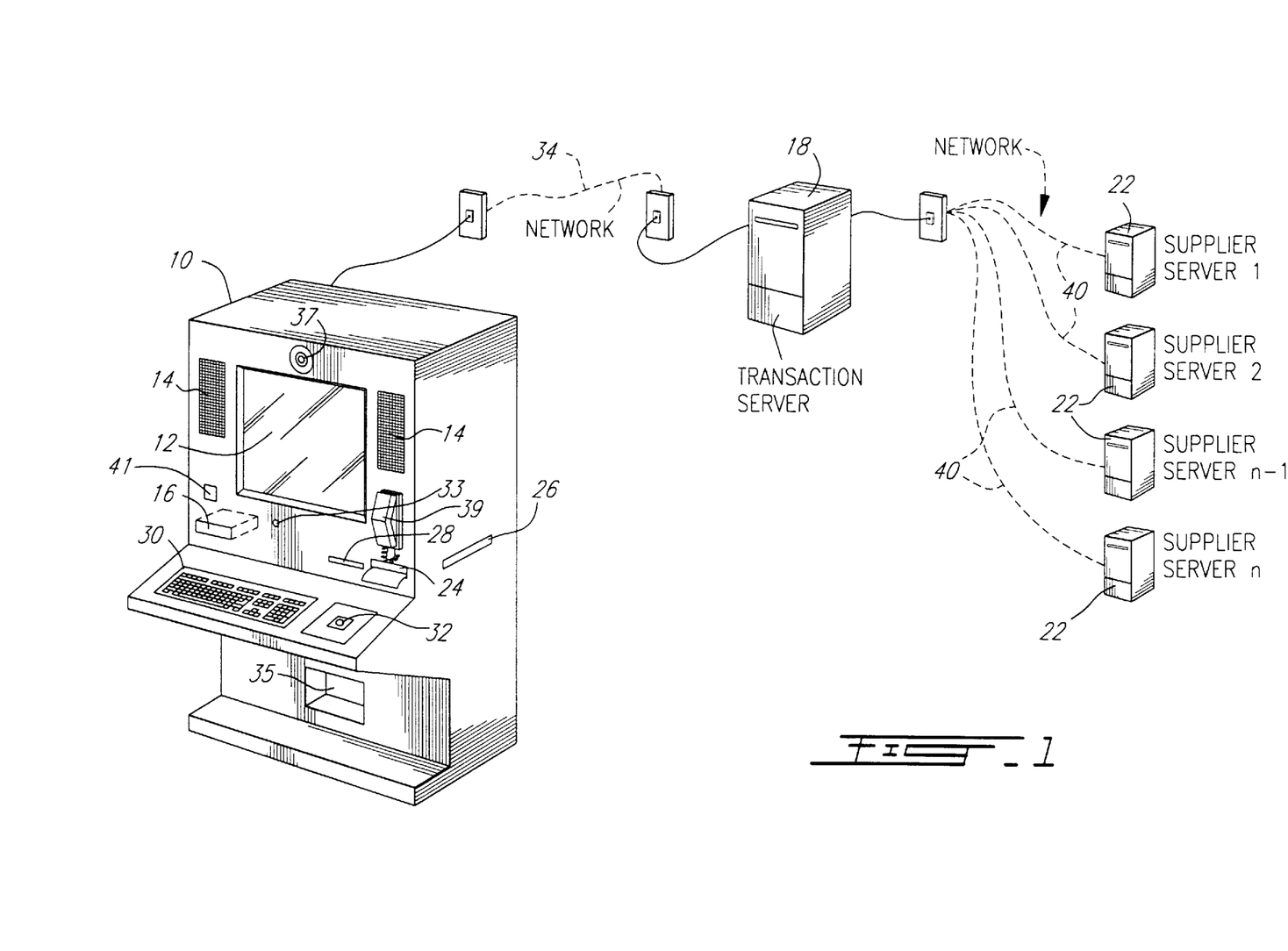
FIG. 1 represents a hardware block diagram of the public purchasing kiosk according to the preferred embodiment.
Figure 2:
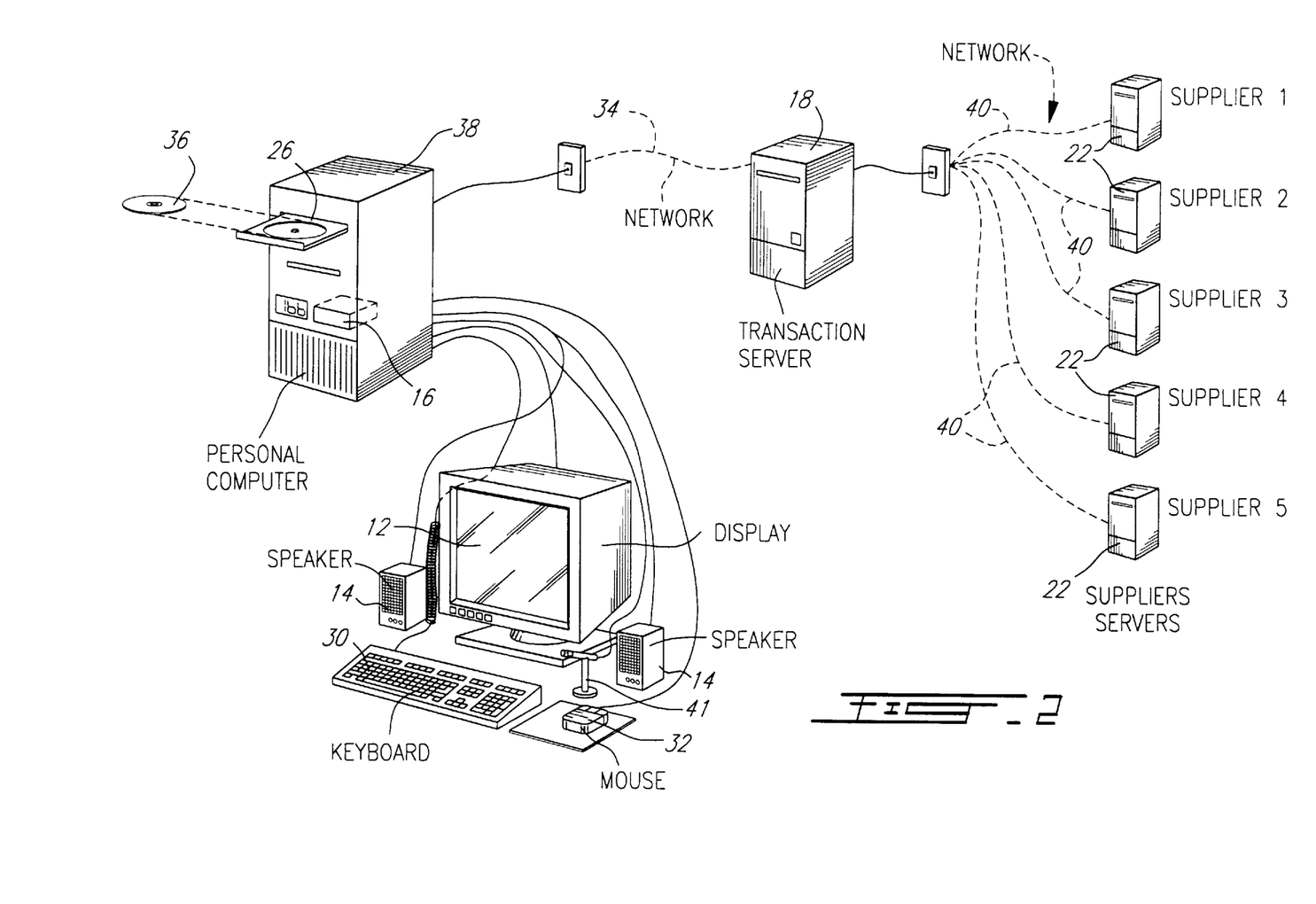
FIG. 2 represents a hardware block diagram of the personal purchasing system using a PC architecture and a CD-ROM drive for local storage of the large multimedia product catalogs according to the preferred embodiment.

Two versions of the purchasing system are disclosed herein. First, in a preferred embodiment of the present invention, an electronic purchasing kiosk 10 as shown in FIG. 1 is disclosed. The electronic kiosk 10 is intended to be installed in malls and shopping centers for public access and may comprise multimedia presentation means such as a display 12 and at least one speaker 14 for real-time presentation of multimedia product-related information. Second, in another embodiment of the invention, a personal computer based purchasing system is disclosed. It is essentially the home based equivalent of the public purchasing kiosk 10 and is intended for personal use at home or at the office, on personal computers equipped with an optical disk drive, such as CD-ROM or DVD drive and with multimedia capabilities, as shown in FIG. 2. The multimedia catalog on disk is distributed to consumers, and the multimedia driver software may be on the disk, may be supplied separately or may be software already owned by consumers (e.g. HTML browser software).

The Public Purchasing Kiosk

The public purchasing kiosk 10 shown in FIG. 1 is a multimedia purchasing system that provides to customers multimedia information about products and services to be sold and that is intended to be placed in malls and shopping centers for public access.

In a preferred embodiment, the purchasing kiosk 10 comprises a Pentium (TM) 166 MHz computer system equipped with at least 32 Mb of RAM and with mass storage means 16 for storing locally on the computer system large volumes of multimedia product-related data. The system mass storage means are characterized by having a high data retrieval rate allowing fast reading of data. The mass storage means are also characterized by the very large volumes of data that may be stored on them (e.g. preferably, at least 500 Mb) and by the fact that they are part of the computer system at the time the data is accessed, in opposition with the network transmitted data which comes from a remote location, at a relatively low rate. Such mass storage means may be a hard-disk drive, a CD-ROM drive in combination with a CD-ROM (or more generally an optical disk reader in combination with an optical disk) or a magnetic tape reader in combination with a magnetic tape that allow fast data retrieval, e.g. at least 1 Mb per second.

The purpose of the electronic kiosk is to present in public places real-time multimedia information, comprising still and motion images, sound and text for customers concerning products and services to be sold. An interesting aspect of this invention is that the product database is stored locally on the computer mass storage means 16 so data is transferred in real-time from the mass storage means 16 to the user interface. For example, a prior art purchasing system using the Internet for downloading product-related images and using a common connection of 33600 bps would receive about 4 kb per second while the data access rate for a hard-disk drive which may be used with the present invention is at least 1 Mb per second, which is 250 times greater than the prior art system.

The present purchasing system 10 also comprises communication means such as a modem in order to communicate small volumes of data with a transaction server 18 via a network 34 for transaction management and for receiving products price and availability information that completes the information contained in the locally stored data coming from the mass storage means. The communication may be done using an ASCII format in order to reduce the volume of transmitted data. The transaction server 18 is an intermediary system located between the client terminal 10 and the suppliers' servers 22 which is connected via a network to every electronic kiosk in a specific area. It is employed for keeping transactions records, for billing the customers for the transactions, for routing orders to suppliers and for providing on-line product price and availability information to customers.

Figure 3:
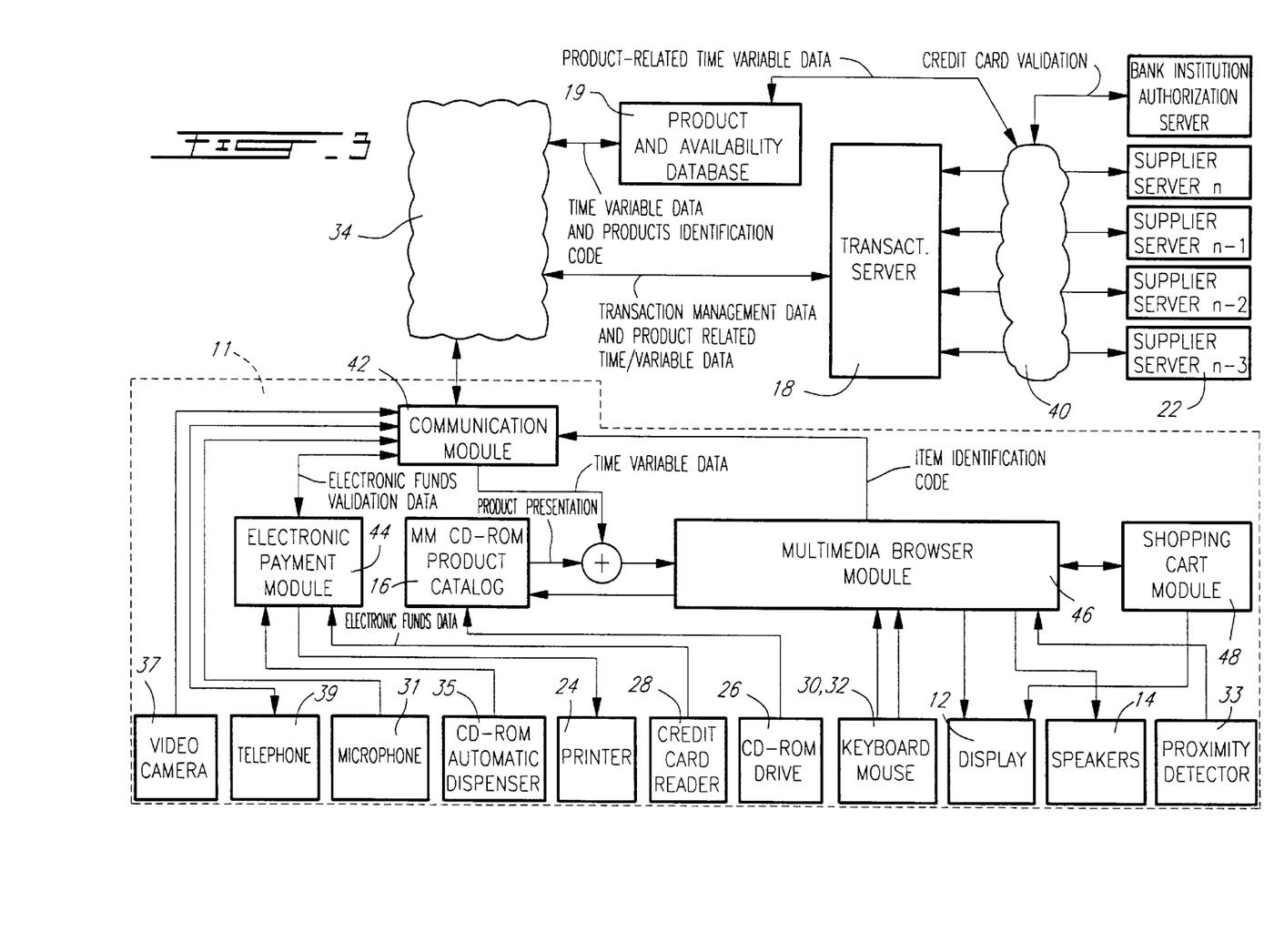
FIG. 3 shows a high level block diagram of the software application run on the present electronic purchasing system.

In a preferred embodiment of the present invention, the electronic purchasing kiosk 10 is equipped with multimedia means for product multimedia presentations such as sound card, speakers 14, a display 12, a printer 24,a fax-modem card and an electronic payment card reader 28. The public purchasing kiosk 10 also comprises an optical disk reader 26 which may be use to install or update the large volumes of data representing product information. This disk reader should be installed on the kiosk lateral or back side, since only company technicians will use it. The electronic kiosk may also comprise product selection and ordering means for accepting the user's input, such as a fixed keyboard 30 and an integrated mouse or track-ball 32, or may be even equipped with a touch sensitive screen 12, which is also used for image displaying, for accepting the user input. The product selection and ordering means may also comprise software modules that may be included in a browser module 46 as shown in FIG. 3 for interfacing the main application program with the input peripheral.

In another preferred embodiment of the present invention, the electronic purchasing kiosk 10 is installed in malls, shopping centers and other well-frequented places and is equipped with a proximity detector 33 in order to start the purchasing application program, beginning with a "Welcome multimedia presentation", each time a person gets close to the purchasing kiosk in order to get his attention. The proximity detector may use infra-red light, ultra-sound or any other technology that allows presence detection. In order to catch the attention of potential customers, the "Welcome multimedia presentation" may contain motion or still images, sounds and music.

When a client gets to the purchasing kiosk 10, the client may browse multimedia product catalogs containing motion and still images of the products to be sold as well as sounds and written information. While browsing catalogs, the client may "fill a shopping cart", i.e. prepare an editable list of items to be purchased. The client may then confirm the transaction and finally may make an electronic payment for paying the purchase: the client may insert a credit card or a debit card to be charged into the electronic payment card reader 28. In a preferred embodiment of the present invention which may apply to both its versions, the virtual shopping cart would appear on the screen in the usual physical form of a shopping cart like an icon, or bigger. The customers may be allowed to pick items from the product catalogs and drop them into the shopping cart for later purchase. As the customer finishes browsing the catalog, he will be asked for product confirmation before the final transaction is made. In the case that the credit or debit card limit is exceeded, or generally, the customer's ability to afford an expenditure at that moment is exceeded by the present transaction amount, the customer may leave selected items in his personal shopping cart, keep them there for future transaction (e.g. the next month) and buy only a limited quantity of products that fit his present budget. The products that are to be purchased are moved from the purchasing cart into a confirmation list while items that are not to be purchased during the current browsing session may be kept in the same personal purchasing cart for any desired period. Each time the customer starts the purchasing application for another browsing session, these items are found in the personal shopping cart. This feature of the invention has great commercial potential because it encourages customers to buy items as soon as finds are available. In the public kiosk, the client does not maintain a personal shopping cart in accordance with the preferred embodiment (although such a variant embodiment is possible). The electronic financial transaction is made over the network 34, which may be the telephone network, using an encrypted format for security purposes, and when the transaction is accepted, an electronic order is sent electronically through the network 34, from the purchasing kiosk to the transaction server. In order to obtain the purchased merchandise, multiple choices are offered to the client: for example, the client could ask for home delivery and in that case he would enter his address by the time of the order or he could ask for stock availability in specific stores and then go to pick up his purchase.

By getting both graphical multimedia presentations and time-variable information, the clients have the impression that they are directly connected to the store. The kiosk looks alive because multimedia presentations comprising still and motion pictures, sound and music are displayed in real-time.

In another preferred embodiment of the invention, the public purchasing kiosk 10 is provided with a CD-ROM drive 26, which may be installed on the lateral side or on the back side of the kiosk and which is intended for database maintenance purpose. New product databases may be periodically transferred from a portable CD-ROM to the kiosk mass storage unit 16 in order to update the local product database. The CD-ROM drive 26 could only be accessed by company maintenance technicians and not by the public.

For the purchasing kiosk 10, revenue may be generated by renting the kiosks to suppliers, by transaction fees billed to customers and by charging suppliers for catalog edition.

In a preferred embodiment of the present invention, the electronic purchasing kiosk 10 may comprise an automatic CD-ROM dispenser 35 in order to automatically sell CD-ROMs containing multimedia product catalogs intended for personal use at home or at the customers' office on their personal computer, as described further hereinbelow. For commercial purposes, when a CD-ROM is automatically sold to a customer using the purchasing kiosk, a rebate coupon of a value equal to the price of the CD-ROM may be printed for the customer for use in particular stores.

In a preferred embodiment of the present invention that may apply to both versions of the purchasing system, the communication network provides broad-band data transmission allowing motion pictures and sound to be broadcast through the network, further product information may be made available by connecting the customer using the client's terminal 11 (which may be either the public purchasing kiosk 10 or the personal CD-ROM version on a PC 38) with a sales-person from a store through on-line video connection. This is made using small cameras 37, speakers 14 and microphones 41 (or a telephone set 39) on each side of the connection. It is especially intended for people preferring human answers to questions on products rather than electronic demonstrations or simply for customers who require more detailed explanation concerning particular features of products.

The same telephone set 33 may be used for on-line credit card validation when a purchase is to be made. Customers may communicate in real time with on-line sales person or with bank institutions for transaction management.

In a preferred embodiment that may apply to both versions of the system, a newsletter may appear each time a customer starts browsing a product catalog or periodically, e.g. at the beginning of each month. The newsletter may contain special prices for products, other product-related information or any other advertising, public service or promotional message that the service provider or the suppliers would want to send to customers. The contents of the newsletter may be either stored on the local storage means 16 within the large volume of product-related data and be caused to appear according to the current date or upon receipt of a control signal from the transaction server 18. Alternatively, the contents of the newsletter may be entirely transmitted from the transaction server 18 via the network 34 to the client's terminal 11, and shown to the customer on receipt.

In another preferred embodiment of the present invention a DVD (digital video disk) player may be used as the mass storage means, wherein the large amount of data would be stored on digital video disks. The DVD player may be used in association with a TV set for displaying the multimedia product presentations. The small volumes of time-variable data may be transmitted via the video cable using a non-visible part of the bandwidth or via the telephone network and the user interface may be the DVD player or the TV's remote controller. The DVD player/TV purchasing system would be able to perform the same tasks as the previously described purchasing kiosk allowing the customer to browse catalogs, to see and listen to multimedia presentations and to place electronic orders instantly.

The Personal CD-ROM Purchasing System

In a second version of the client's terminal (FIG. 2), software applications containing the same electronic multimedia catalogs as described before are distributed on a portable mass storage data recording medium such as a CD-ROM 36 and are either distributed free of charge or sold to customers who are interested in a specific catalog. The portable mass storage means is characterized by large volumes of data that may be recorded on it and by the fact that it is removable from its corresponding reader. Such a portable mass storage means may be a CD-ROM or more generally an optical disk or a magnetic tape, which are removable from the CD-ROM drive or from a tape reader, in opposition with a hard-disk drive where the reader and the disk form a single block. Portable mass storage means are intended for distribution to customers since they represent an economic way of transmitting data to clients. In a preferred embodiment of the present invention, the portable mass storage means is a CD-ROM, while other means may be suitable as well. The CD-ROM 36 is the software equivalent of the public purchasing kiosk 10 except that it is intended for personal use, at the client's home or office, on a multimedia PC 38 comprising multimedia means for multimedia presentations. Exactly the same principle applies to the use of this personal purchasing systems with the only difference that a smaller amount of local data may be available on the CD-ROM databases, so limited number of catalogs will be included on a single CD-ROM, or generally on a portable mass storage means.

The large volumes of local data that contains the multimedia catalogs are stored on a CD-ROM 36 while the small volumes of transmitted time-variable data come from the same transaction server 18 used with the public purchasing kiosk 10. As the CD-ROM drive 26, or generally, the portable mass storage means reader has a worse data access rate than a hard-disk drive, the user may be allowed to transfer the electronic catalogs from the CD-ROM 36 onto other mass storage means 16, such as the PC's hard disk, in order to improve the data retrieval rate for the large volumes of locally-stored data. Moreover, the CD-ROM electronic catalogs 36 may be in a compressed format in order to allow more data to be stored onto the CD-ROM, and an installation of the catalogs onto the PC's hard-disk drive, if that latest one is spacious enough, may be suitable in order to allow even greater data access rates. In the case that the hard disk is not spacious enough, the catalogs could still be read directly from the CD-ROM 36.

For improved performance, the user may have to install a limited volume of software applications from the CD-ROM 36 onto his PC's hard-disk in order to be able to start more rapidly the purchasing application. The user could then browse the multimedia catalogs contained onto the hard-disk, select products and order them on-line in the same manner as for the electronic purchasing kiosk previously described. The data related to the products left in the shopping cart is stored locally on the client's PC using a memory, that may be a file on a hard disk, a chip or any other electronic or magnetic means for storing data. Editing means may be used for editing the shopping cart list at any moment of the purchasing session. Such means may be a software module that may be separated or incorporated into the browser module that allows the customer to add or remove items from the shopping cart at various moments of the shopping session. As can be appreciated, a shopping cart can be filled with items that the consumer would like to buy or has definite plans to buy as soon as fluids are available. The purchase can be made when finds are available or when desired, and if the purchase is too great, items can be removed from the shopping cart. The total purchase cost of products contained on the list making up the shopping cart may vary over time. The system obtains up to date pricing and availability data regarding products in the shopping cart to give an accurate total of the purchase amount and to confirm that all items are available. In both versions of the invention, right before the electronic transaction takes place, confirmation means may be used for confirming the items the customer wants to buy. Such confirmation means may be a software module which may be separate or incorporated into the browser module and that allows the user to confirm every important piece of information related to the transaction, such as the total cost, the verification of the items to be sold, the payment method and every other important data element related to the current transaction.

The Transaction Server

The transaction server 18 is a computer system dedicated to transaction management. The transaction server 18 also comprises order processing means for accepting orders sent from the purchasing terminals 10 or 38 via the network 34 to the transaction server 18 and for validating the transactions. Such order processing means may be a transaction managing application program which is run on the transaction server. This transaction managing application program records all the transactions made from the purchasing terminals connected thereto, performs locally or remotely credit or debit card transaction validation and bills the transaction fees to the customers.

In addition to its transaction recording function, the transaction server 18 provides on-line information to purchasing terminals concerning price and product availability. It contains a product and availability database 19 comprising price and availability information downloaded via a network 40 from the suppliers' servers 22. Since the time-variable information database is stored on the transaction server 18 which is directly connected to the purchasing terminals 10 and 38, this information can be transmitted in real-time to these purchasing terminals without the necessity of further connecting to specific suppliers' servers. However, the product database contained on the transaction server 18 is updated regularly via a network 40 with information received from the suppliers' servers 22. The product and availability database 19 may also be stored on another server than the transaction server 18, if this is found more convenient.

The Communication Network

The communication network 34 is needed in order to allow the purchasing terminals 10 and 38 to access remotely the transaction server for getting the small volumes of product time-variable information and for on-line product ordering.

The communication network 40 is employed for downloading product-related information, such as prices and availability, from the suppliers' servers to the transaction server in order to update the transaction server's product database.

The communication network may be the common telephone network in order to minimize special hardware installation. In order to minimize costs, use of the common telephone network in association with the use of toll-free numbers are suggested for placing electronic orders from the client's terminals as well as for the product-related information download from the suppliers' servers to the transaction server.

Software Requirements

A number of application programs are required in order to allow the public purchasing system 10 and the personal CD-ROM system 38 to perform the requested tasks.

Both application programs used on either the public purchasing system and on the personal CD-ROM system have basically the same structure and perform the same tasks.

FIG. 3 shows the high level block diagram of the software application used with the present purchasing system. The suppliers' servers 22 are connected to the transaction server 18 via a network 40 in order to update regularly the transaction server product database. The transaction server 18 is connected via a network 34 to the client's terminal communication module 42 in order to send the time-variable data and to receive electronic orders. The communication module 42 may be a communication application, in combination with hardware communication equipment, which is able to support the transmission protocol used by the system. Data is coming from both the communication module 42 and from the local multimedia product catalog 16 to the multimedia browser module 46, which performs the multimedia product presentation for customers.

The communication module 46 also communicates data to the electronic payment module 44 in order to perform credit or debit card verification. The electronic card reader 28 reads the credit or debit cards and transmit data to the electronic payment module 44 which then confirm the transaction by sending confirmation data to the printer 24 for transaction written confirmation.

The same electronic payment module 44 may control the CD-ROM automatic dispenser 35 by transmitting a signal, when the CD-ROM has been paid, in order to release a CD-ROM for the customer.

The communication module 42 is also connected to a video camera 37, to a telephone set 39 and to a microphone 41, in order to allow voice and image transmission from the client's terminal toward the transaction server 11. Clients may use this feature in order to be connected on-line to sales-persons for receiving more detailed information about particular products. The telephone set 39 may be used for private conversation with financial institution persons, for example, for transmitting credit card information.

The CD-ROM drive 26 may be used in order to update periodically the local databases contained in the mass storage means 16 of the public purchasing kiosk 10.

Figure 4:
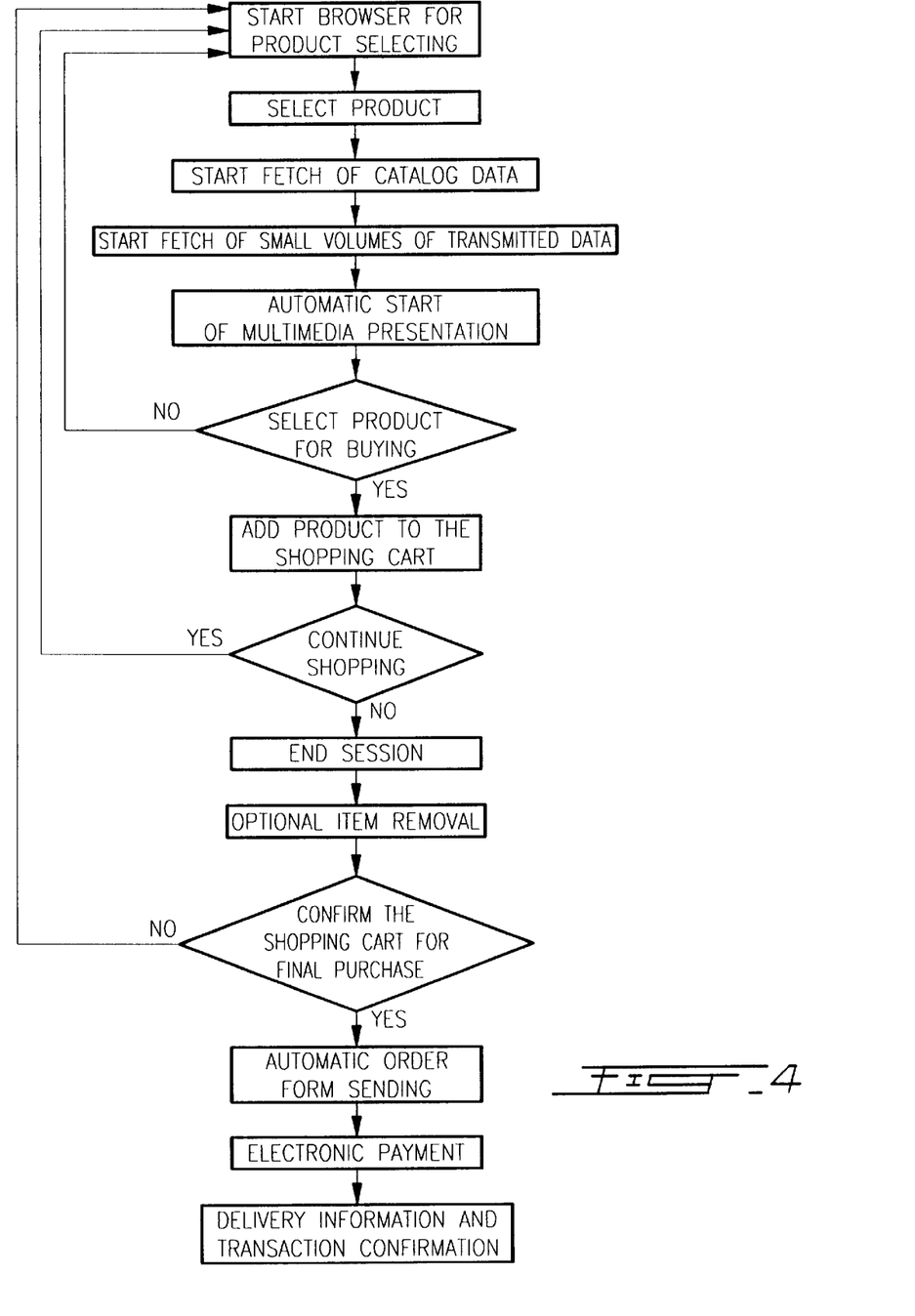
FIG. 4 shows a flow chart of the software used with the electronic purchasing system according to the preferred embodiment.

The browser module 46 is connected to the shopping cart module 48 and sends to it the data related to the product selected by the client. The shopping cart module finally sends the data related to all products to be sold during the present transaction to the electronic payment module in order to have the total price to be charged for that transaction. FIG. 4 shows the purchasing system software application flow chart. First, the customer starts a browser-type application program leading him through product catalogs. That application may comprise a multimedia browser module 46 for product browsing and multimedia presentation wherein data is coming both from the product database stored locally on the purchasing system and from the remote transaction server. After finishing browsing or even while browsing, the customer may fill a shopping cart. The client will then be asked to confirm the current purchase and insert the credit card for billing into a credit card reader.

In a preferred embodiment of the present invention, for improved shopping convenience, the browser application may be equipped with search engines for finding a specific item or a specific group of items into the local product database. This may be done by using keywords either for searching a product, a group of products, a brand-name or other association of product characteristics. Another way of doing the search for a product would be to select a group of items from a menu provided by the browser application getting more and more specific as more sub-menus are opened, to get finally to a limited number of products having similar characteristics. These searches are all done first locally, in the local product database. Only after having found the specific items, the system communicates with the transaction server to receive the timevariable data related to these items by transmitting, for example, an identification code of the product.

In a preferred embodiment of the present invention, the browser software application may comprise a module that performs queries using the received time-variable data in order to sort that data and present it in a specific format. For example, the customer may be interested only in items whose prices are less than a pre-determined product may be grouped into price groups allowing particular customers to browse only in the group of products that corresponds to their budget. Another feature may be to allow only available products to be presented by the browser application and skipping products that are not presently available, as indicated by the downloaded time-variable data.

Adaptive Configurable Electronic Catalog

In a preferred embodiment of the present invention, the large volumes of locally-stored data may be grouped in groups of seasonal products as controlled by the data received from the transaction server 18 via the network 34. Catalog format and/or organization control data may be downloaded from the transaction server 18 to the client's terminal 10 or 38 for presenting the products during a browsing session in a particular order or using a particular layout for best selling results. For example, this downloaded data may be useful for emphasizing particular products that are best sellers by placing them on the first page of a catalog. The downloaded data may contain product identification numbers grouped in an index and this index may then be used by the multimedia presentation means for obtaining a particular layout when presenting the products contained in the catalog. Groups of products may also be formed using this downloaded data in order to present to customers only products related to the current season. Such groups of products may be inaccessible for the customers for a specific period and then, at a particular date, become accessible, as controlled by the downloaded control data. For example, the group of products related to Christmas may become accessible for clients after Thanksgiving and then may become again inaccessible after the New Year. The current date may also be used as a key for allowing the groups of seasonal products to be accessible for customers. The current date used by the browsing module 46 may be either taken from the local system 10 or 38 or received over the network 34 from the transaction server 18, as controlled by the downloaded control data. Using the downloaded data, complete control over the locally stored multimedia presentations of the products is possible: the presentation layout, the order of presentation of products, the product prices and the product availability may all be controlled over the network 34 from the remote transaction server 18.

In another embodiment of the invention, a client's terminal using an out-of-date version of the product catalog may receive structure data of the up-to-date catalog from the transaction server 18. When this structure data refers to a new item that is not contained in the locally-stored large volume of product related data because this is an out-of-date catalog, the multimedia presentation means may either only present items whose presentations are available by simply skipping others or may specifically indicate to the customers that other new items are available in this specific group of items (e.g. running shoes) in a new catalog.

In another preferred embodiment of the invention, the multimedia presentation means may create a virtual customer profile using previous customer purchases and/or previous customer browsing selection. This virtual customer profile may then be used by the multimedia presentation means for re-arranging the product-related data in a personalized layout especially convenient for this customer.

The CD-ROM version of the purchasing system disclosed by this invention is the software equivalent of the public purchasing kiosk. Most modules of the software application designed for the public kiosk, such as the catalog browser, the communication module and the electronic multimedia catalog shall be used as-is in the personal CD-ROM version of the purchasing system. However, the CD-ROM application program may further comprise:

1. a set-up software program for the software installation from the CD-ROM onto the client's PC;
2. a user's technical electronic manual program and help program covering each possible selection of the user;

The transaction server runs one or more application programs which allow performing the following functions:
1. Accept an incoming call from a remote kiosk;
2. Accept a data package giving SKU (or similar), quantity, shipping address and billing information and transmit time-variable information to the client's terminals such as the price and availability;
3. Verify the order against the database and transmit shipping information back to the client's terminal;
4. Perform a credit card verification or forward the data to banks for performing a remote credit card verification;
5. Permit the system to obtain financial and accounting information.

What is claimed is:

1. A multimedia catalog system comprising:

a mass storage device storing locally at least one electronic multimedia catalog containing a large volume of product-related data representing each of a plurality of products to be sold, said mass storage device having a data retrieval speed for real-time presentation of said multimedia product-related data;

a communication interface device obtaining automatically from a remote server small quantities of time-variable data related to a selected product, representing at least one of product price and product availability; and a multimedia presentation system presenting said large volume of data and said time-variable data in association with one another in real-time for a selected one of said plurality of products.

2. The catalog system as claimed in claim 1, wherein said mass storage device comprises a portable data recording medium reader capable of reading a portable data recording medium on which said large volumes of data are stored.

3. The catalog system as claimed in claim 2, wherein said reader is an optical disk reader.

4. The catalog system as claimed in claim 1, wherein said communication interface device obtains automatically from said remote server said small quantities of time-variable data for only said selected one of said plurality of products, whereby said communication interface device only retrieves said time-variable data for those selected products to be presented by said multimedia presentation system.

5. The catalog system as claimed in claim 4, wherein said communication interface device comprises a modem.

6. The catalog system as claimed in claim 1, further comprising a product selection and ordering interface device for obtaining a user input for product order selection and for placing an electronic order.

7. The catalog system as claimed in claim 6, wherein said product selection and ordering interface device comprises:

a memory for storing a list of products selected for order;

an editor for editing said list; and a confirmation input device for obtaining a user input to confirm that products on said list are to be ordered.

8. The catalog system as claimed in claim 1, wherein said time-variable data comprises catalog organization control data, said multimedia presentation system using said control data to organize said large volume of product-related data for presentation.

9. The catalog system claimed in claim 8, wherein said organization control data comprises a unique product identification code, said multimedia presentation system using said product's identification code to organize said large volume of product-related data for presentation.

10. The catalog system claimed in claim 8, wherein said communication interface device sends catalog version identification data to said remote server and receives back from said server particular configuration data corresponding to said catalog version identification data for presenting a selection of products among all products represented by said large volumes of product-related data found on said mass storage device.

11. The catalog system claimed in claim 8 wherein said catalog organization control data comprises current up-to-date catalog structure data, said multimedia presentation system using said structure data for presenting out-of-date product presentations available on said mass storage device in a possible layout, wherein if a latest product is only available with a new up-to-date catalog but not with an existing out-of-date local catalog, said multimedia presentation system present only available products by skipping others.

12. The catalog system claimed in claim 11 wherein said multimedia presentation system provides an indication for a customer when said current up-to-date catalog structure data includes reference to a product available on new catalogs but not with said local out-of-date version of said product catalog stored on said local mass storage device.

13. The catalog system claimed in claim 1 wherein said multimedia presentation system reads a current date value from a real-time clock and uses said current date as a condition for presenting a selection of seasonal products among all products represented by said large volumes of product-related data found on said mass storage device.

14. The catalog system claimed in claim 1 wherein said multimedia presentation system creates a customer profile from at least one of previous customer purchases and previous browsing selections and re-arranges said product-related data for presentation in a particular layout for said customer.

15. A multimedia public purchasing kiosk comprising:
   a mass storage device for storing locally at least one electronic multimedia catalog containing a large volume of product-related data representing each of a plurality of products to be sold, said storage device having a data retrieval speed for real-time presentation of said product-related data;
   a communication interface device for obtaining from a remote server small quantities of time-variable data related to a selected product, representing at least one of product price and product availability;
   a multimedia presentation system presenting said large volume of data and said time-variable data in association with one another in real-time for a selected one of said plurality of products;
   a product selection and ordering interface device for obtaining a user input for product order selection and for placing an electronic order; and
   an order processor located at a second server for receiving said electronic order, authorizing payment for said product order selection, and placing at least one order on behalf of said user.

16. The kiosk as claimed in claim 15, further comprising means for obtaining electronic payment of ordered products.

17. A public multimedia purchasing kiosk as claimed in claim 15, further comprising a proximity detector for detecting human presence and generating a detection signal, said multimedia presentation system receiving said detection signal and initiating a presentation in response to said detection signal, whereby each time a person approaches said multimedia purchasing kiosk said presentation attempts to attract attention.

18. A public multimedia purchasing system as claimed in claim 16, further comprising:
   an automatic portable mass storage data recording medium dispenser; and
   an actuator to dispense a portable mass storage data recording medium, whereby product catalogs stored on said portable mass storage data recording medium are dispensed to the public from said kiosk.

19. A public multimedia purchasing system as claimed in claim 18, wherein said actuator comprises a funds acceptors for accepting a small payment for dispensing said data recording medium, whereby coin, bill, or electronic payment is required to obtain said data recording medium from said dispenser.

20. A public multimedia purchasing system as claimed in claim 19, further comprising means for issuing one of an account credit and a rebate certificate in response to receipt of said small payment, whereby customers recover said small payment when conducting a future purchase.

21. A method of presenting multimedia product information comprising the following steps:
   providing a multimedia product presentation system including an electronic mass storage device for storing large volumes of product-related electronic data locally for data access;
   obtaining automatically from a remote server small quantities of time-variable electronic data representing at least one of product price and product availability;
   presenting in real-time said large volumes of electronic data and said time-variable electronic data in association with one another for a selected one of a plurality of products.

22. The method as claimed in claim 21, wherein said step of providing a multimedia product presentation system comprises distributing portable mass storage electronic data recording mediums to customers, said product presentation system including a reader for said portable electronic data recording mediums, said portable mediums comprising at least one product multimedia catalog.

23. The method as claimed in claim 22, wherein said portable electronic data recording mediums comprise optical disks.

24. A multimedia catalog purchasing system comprising:
   a mass storage device storing locally at least one electronic multimedia catalog containing a large volume of product-related data representing each of a plurality of products to be sold, said mass storage device having a data retrieval speed for real-time presentation of said multimedia product-related data;
   a communication interface device obtaining from a first remote server small quantities of time-variable data related to a selected product, representing at least one of product price and product availability, and carrying out communication of purchase transaction data with a second remote server;
   a multimedia presentation system presenting said large volume of data and said time-variable data in association with one another in real-time for a selected one of said plurality of products;
   a product selection and ordering interface device for obtaining a user input for product order selection and for placing an electronic order; and
   an order processor located at said second server for receiving said electronic order, authorizing payment for said product order selection, and placing at least one order on behalf of said user.

25. The catalog purchasing system as claimed in claim 24, wherein said product selection and ordering interface device comprises:

a memory for storing a list of products selected for order;

an editor for editing said list; and a confirmation input device for obtaining a user input to confirm that products on said list are to be ordered.

26. The catalog purchasing system as claimed in claim 24, wherein said plurality of products in said multimedia catalog have a plurality of sources, said order selection comprises products from different sources, and said order processor places a plurality of orders with said different sources, whereby a single payment authorization is used by said order processor to place orders with different product sources, thereby avoiding the need for the user to place many different orders.

27. The catalog purchasing system as claimed in claim 25, wherein said plurality of products in said multimedia catalog have a plurality of sources, said list comprises products from different sources, and said order processor places a plurality of orders with said different sources, whereby a single payment authorization is used by said order processor to place orders with different product sources, thereby avoiding the need for the user to place many different orders.

28. The multimedia public purchasing kiosk as claimed in claim 15, wherein said time-variable data comprises catalog organization control data, said multimedia presentation system using said control data to organize said large volume of product-related data for presentation.

* * * * *